UNITED STATES PATENT OFFICE.

PASCAL MARINO, OF PARIS, FRANCE.

ELECTROLYTIC BATH.

SPECIFICATION forming part of Letters Patent No. 607,646, dated July 19, 1898.

Application filed December 1, 1896. Serial No. 614,121. (No specimens.) Patented in Belgium June 15, 1896, No. 121,776.

*To all whom it may concern:*

Be it known that I, PASCAL MARINO, a subject of the King of Italy, residing at Paris, France, have invented new and useful improvements in electrolytic baths for extracting from metallic salts their metal either separately or in any desired composition of their alloys, (for which I have obtained a patent in Belgium, No. 121,776, bearing date June 15, 1896;) and I do hereby declare that the following is a full, clear, and exact description of the invention, which will enable others skilled in the art to which it appertains to use the same.

The object of my invention is to extract all kinds of metals from their salts by means of an aqueous bath, which serves to obtain their metals separately or as alloys, either in the shape of a compact mass or as deposits on the surface of any metal or alloy whatever, even of the same kind with that to be deposited, or, more generally, on any conducting-surface desired.

The electrolytic deposits of different metals and alloys obtained by my process adhere strongly to metals they are deposited on, and the reason for that is that the metallic cathode enters on its surface into alloy with that metal whose deposits it receives. Besides that, they exhibit a very perfect cohesion and a remarkably bright metallic luster.

For my bath I prepare a solution, say, of one equivalent of that metallic salt which I propose to deposit by electrolysis, selecting such salts as form insoluble precipitates with barium, strontium, calcium, or lead, and another solution of the salt, either of barium or of calcium or of strontium or of lead, containing less than one equivalent of it. Then I mix up these two solutions, and in consequence of the double decomposition taking place in the mixture an insoluble precipitate is formed, and the remaining liquid I use as the basis of my electrolyte. This saline solution resulting from an incomplete decomposition becomes in the latter case a mixture of different salts of the same metal—for example, of sulfate with chlorid, sulfate with acetate, sulfate with nitrate, chlorid with acetate, chlorid with nitrate, &c.

The following examples I believe will illustrate more clearly the essential features of my process:

First. A solution containing one equivalent of sulfate of magnesium is mixed with a solution containing less than one equivalent of chlorid of barium. It will give an insoluble precipitate of sulfate of barium in a solution of sulfate and of chlorid of magnesium. By decanting or filtering I separate the liquid from the precipitate, which liquid is employed as the electrolyte for depositing magnesium.

Second. I mix a solution of chlorid or of nitrate or of acetate of that salt whose metal I want to deposit with a solution of a salt which gives by double decomposition an insoluble precipitate and a liquid to be used for electrolysis. Thus I mix together one solution containing one equivalent of chlorid of aluminium with another one containing less than one equivalent of acetate of lead. This gives me an insoluble precipitate of chlorid of lead and a liquid containing the acetate of aluminium with chlorid of aluminium. Having purified the liquid of the traces of lead remaining in it by means of sulfureted hydrogen, the same is ready to be used as the basis of electrolyte for depositing aluminium.

Third. A solution containing one equivalent of sulfate of chromium is mixed with a solution containing less than one equivalent of chlorid of calcium. An insoluble precipitate of sulfate of calcium is obtained and a solution of chlorid of chrome with chrome sulfate in it, which will deposit chrome when set to action.

Fourth. A solution containing one equivalent of sulfate of manganese is mixed with a solution containing less than one equivalent of chlorid of strontium. A precipitate of sulfate of strontium is produced, and the liquid contains chlorid of manganese with its sulfate, to be used for the electrolytic bath.

The liquid for electrolysis may also be prepared without adding to it alkali-metal salts and obtained directly by double decomposition. For example, I take for the magnesium bath a solution containing an equivalent of sulfate of magnesia, to which an alkali-metal sulfate is added. This solution I mix with another one containing some chlorid of an alkali-earth metal, but not enough of it to precipitate the whole of the sulfuric acid combined with the magnesia and with the alkali. The double decomposition will give an insoluble precipitate of sulfate of the alkali-earth metal and a liquid which will contain a mixture of chlorid with sulfate of magnesia and of alkali.

For the direct treatment of minerals with the object of extracting their metals I employ, as it has already been pointed out above, an electrolyte obtained by an incomplete double decomposition. For example, when I want to extract copper from a mineral the electrolyte is prepared with a solution of sulfate of copper. An alkali-metal sulfate is added to it, and it is mixed with an insufficient quantity of chlorid of an alkali-earth metal, so as not to precipitate the whole of the sulfuric acid combined with copper and the alkali. There will be formed a sulfate of the alkali-earth metal, and the liquid, decanted or filtered, will contain only a mixture of sulfate and of chlorid of copper, together with sulfate and chlorid of the alkali. For the sake of making this liquid a better conductor and in order to facilitate the decomposition of the mineral I add a mineral acid, either sulfuric or chlorhydric, and I use in the bath the mineral itself as a soluble anode.

It may appear at the start that the preparation of an electrolytic bath by way of double decomposition and the assertion that by these methods of preparation entirely different results are obtained, not sanctioned by theoretical considerations, are, so to say, "fancies." Yet I affirm that numerous experiments prove that I am right. In fact, I insist that from a theoretical standpoint I do not do anything else but to utilize the well-known laws of Berthollet. It is only necessary to understand them well in order to apply them with full certainty.

Actually Berthollet's laws say that the reaction taking place in a mixture of two different salts is complete whenever there is an insoluble precipitate. This phenomenon can be easily explained by taking in consideration that the precipitating particles destroy the chemical equilibrium existing between two opposing reactions. Mr. Gottier, of the Institute of France, says, in his work on chemistry, that this explanation is perfectly true and that it was first advanced by Gay-Lussac. Besides that, it is proved that an exchange, although an incomplete one, takes place even in this case when a mixture of two different salts does not give an insoluble precipitate—as, for instance, when a colorless solution of chlorid of sodium is mixed with a blue solution of sulfate of copper, which phenomenon is observable on the green color of the mixture; but in this case the reaction is never complete. It is useless to adduce further examples of the same kind. A very characteristic change of color is observable when an electric current is allowed to pass through the solution of chlorid and of sulfate of copper, which fact shows that the above-mentioned laws are applicable to the mixture of different salts of the same metal.

According to Berthollet's laws the reaction would have been complete if the chemical equilibrium were disturbed by the falling particles of the precipitate. Why should not the same phenomenon take place when another force—for instance, the electric force—were to act in the same sense? This gives the theoretical explanation of the above-mentioned case. At the same time when the metallic particles go from one chemical combination into another under the influence of a current they are exposed in a free or nascent state and become ready to be precipitated on the cathode.

It was known long ago that very weak currents can pass through conducting liquids and that they conform themselves to Ohm's law. This is why Clausius in 1857 (*Poggendorf's Annalen*, 101, 338) contended that any such hypothesis, as that of Grotthus, which considers as united or joined together the two constituents of an electrolyte is not admissible and that the same is in contradiction with Ohm's law.

Certain relations were established between the osmotic pressure and the freezing-point and the lowering of freezing-point and the rising of boiling-point of solutions. It has been demonstrated that such depressions and risings are directly proportional to osmotic pressure of solutions, and consequently to the number of molecules they contain. (Van't Hoff Arrhenius, *Zeit. Phisik Chem.* 3, 115, 10,51.) The molecular depression of freezing-point—i. e., the product resulting from the multiplication of molecular weight by the depression for each gram of dissolved matter—can be figured out. However, those bodies whose aqueous solutions conduct electricity generally give results higher than what the theory calls for. The same remark applies to the osmotic pressure. In order to explain these anomalies, Arrhenius assumes (1887, *Zeit. Phys. Chem.* 1, 631) that electrolytic molecules are already decomposed into their elements before the passage of the current and that they do not contain anything but electropositive and electronegative ions. This decomposition most likely is not a complete one, especially in the case of solutions of mean concentration forming what is termed "electrolytic disassociation." Therefore when an electrolyte is decomposed by a current it is because the molecules are beforehand separated into ions. The current does not do anything else but to transfer the ions to respective poles, but it does not separate them. On the contrary, if the current passes through it is because the ions are already separated. The osmotic pressure has increased in consequence of this disassociation. In whatever way this exchange between the ions of two salts of the same metal takes place it conforms itself always necessarily to the theory of Arrhenius. This theory explains in a quite satisfactory manner the anomalies which the electrolytes exhibit in opposition to the laws of Raoult and to the researches of Pfeffer. (*Osmotische Untersuchungen,* Leipsic, 1877.) This continuous double exchange between the ions permits to explain the results of my invention. If between the two kinds of anions some of them transfer themselves more easily than the others and attack with greater energy the anode, my aim is reached. I have economized the electric force and made the metallic deposits more regular, getting at the same time a more coherent and adherent deposition thereof to the cathode. The novelty of my process is based, therefore, on the actual fact that I have utilized the abstract hypothesis of scientific men and have verified it by numerous experiments.

Whatever may be the case—*i. e.,* whether the liquids produced in the above examples are obtained by double decomposition or the salts themselves are gotten by some other chemical processes or taken as found in nature—it is always necessary to add to the liquid a solution of an alkaline salt—as, for instance, that of ammonium, of potassium, of sodium, or of a compound of two or of three of them in a proportion of not less than one-sixth of that of the metal contained in the electrolytic solution, and, moreover, there must be put in it a similar proportion of some organic acid or of boric acid.

I add the salt of an alkali metal for the purpose of diminishing thereby the internal resistance of the bath to the electric current, as experience has demonstrated that it does it, and, in the second place, for the sake of decreasing the acidity of the bath, as too great an acidity of the latter not only affects but even is apt to destroy the metallic deposit. By thus making the bath neutral I prevent the recombination of ions once separated or the formation of new compounds.

The reason for adding organic acid to the electrolyte is partly for maintaining a constant density in the bath and partly from the following considerations: The specific weight of the organic molecule is smaller than that of the usual inorganic molecules, which is shown by the fact that the specific gravity of organic bodies is generally less than that of inorganic ones, while, on the other hand, organic molecules possess a much greater facility for being decomposed than the inorganic ones, and thus require only a very small initial impulse to set them in motion. Recurring now to the theory of Arrhenius and Berthollet, the function which Gay-Lussac attributes to the falling particles of the precipitate is in this case effected by the organic acid. In the phenomenon of separation of molecules into cations and anions the organic acid acts to facilitate the decomposition.

It is true that Mr. Roseleur has already employed ammonium chlorid for nickel-plating, that Edward Weston has heretofore added to his electrolyte free or compound boric acid, while Mr. Hainantz has used a tartrate or tannic acid; but in all these cases the alkaline solution and the organic acids, like the boric acid, have been applied separately and for ordinary baths, while in my process they are applied to my special baths in a very definite proportion. Therefore it makes my process applicable to all metals, like a general law.

Another example: A bath is prepared with the salt of magnesium, and two anodes are used, of which one anode is insoluble, being made, for example, of carbon. The other anode is soluble and is of zinc, lead, tin, &c. The cathode is of iron or of any other metal on which an electrolytic deposit of an alloy of magnesium with either zinc, lead, tin, &c., according to what metal is used for the soluble anode, will be obtained. The same method must be followed when a deposit of iron, manganese, chromium, cobalt, tungsten, copper, &c., is to be produced. All metallic deposits which come out of my bath have a very bright metallic luster and adhere strongly to the metal they are deposited on. Under the stated conditions the above-mentioned reactions are alike applicable whether for the formation of deposits of separate metals or for their alloys. Thus, for example, in order to obtain an alloy of aluminium, magnesium, and chromium all that is necessary is to employ a solution containing the salts of those metals. An organic acid or boric acid must be added to it, together with an alkaline salt or salts, such as would not form an insoluble precipitate with either of the metallic salts whose deposits are desired.

The electrolysis is carried on in waterproof tanks made of wood or some other such substance which is not affected by the solution it comes in contact with.

For the anodes carbon or any other conducting substance not affected by the products of chemical reaction may be employed, or, still better, they must be conductors, remaining unaffected while in contact or in agglomeration with insoluble salts or the oxid of the metal contained in the bath. This last one—namely, the oxid of the metal—in the meantime will form soluble salts, needed for the keeping up at the same requisite degree the concentration of the bath it had at the start. The anodes may be made of the same metal I intend to deposit.

For the cathodes may be employed a piece either of the metal whose production is contemplated or of that alloy which is to be formed by the deposits. In fact, anything may serve for cathode if by its nature it is a conductor and will receive the deposit and will allow the same to be separated from it when necessary for further use.

If the metal or the alloy to be deposited has to be used for plating or surface-covering of certain objects, as it is the case in silver, nickel, gold, &c., plating, then these same objects serve as cathodes.

The bath is fed by adding to it from time to time the necessary quantity of solutions of salts of those metals whose deposits are sought. Soluble metallic anodes may do that also. Likewise oxids and salts placed at the anode or in the bath will answer just as well.

Having thus described my invention, the following is what I claim as new therein and desire to secure by Letters Patent:

1. The process of electrolytic production of metals, consisting in adding to a solution of a salt of the metal to be deposited alkali-metal salts of the same acid and an alkali-earth-metal salt of another acid in such quantity as to give, by an incomplete double decomposition, an insoluble precipitate and a mixed solution of different soluble salts of the metal to be deposited, and electrolyzing such mixed solution.

2. The process of electrolytic production of metals consisting in adding to a solution of a salt of the metal to be deposited, an alkali-metal salt of the same acid, and also adding an alkali-earth-metal salt of another acid in such quantity as to give, by an incomplete double decomposition an insoluble precipitate, and a mixed solution of different soluble salts of the metal to be deposited, adding to the mixed solution an organic acid and electrolyzing this mixture.

3. The process of electrolytic production of metals contained in minerals, consisting in adding to a solution containing the salt of the metal to be deposited mixed with alkali-metal salts of the same acid, an alkali-earth-metal salt of another acid in such quantity as to give by incomplete double decomposition an insoluble precipitate and a mixed solution of different soluble salts of the metal to be deposited, and also adding an organic acid and an acid such as chlorhydric or sulfuric acid capable of attacking the mineral, and electrolyzing the mixed solution by passing an electric current therethrough, the mineral itself, in the bath, being used as the soluble anode.

PASCAL MARINO.

Witnesses:
EDWARD L. STAREK,
EDWARD P. MACLEAN.